United States Patent
Baba

(10) Patent No.: US 10,865,772 B2
(45) Date of Patent: Dec. 15, 2020

(54) DATA COLLECTION SYSTEM AND METHOD FOR WIND TURBINE POWER GENERATION FACILITY, AND WIND TURBINE POWER GENERATION FACILITY

(71) Applicant: MITSUBISHI HEAVY INDUSTRIES, LTD., Tokyo (JP)

(72) Inventor: Mitsuya Baba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 42 days.

(21) Appl. No.: 15/936,485

(22) Filed: Mar. 27, 2018

(65) Prior Publication Data
US 2019/0010922 A1    Jan. 10, 2019

(30) Foreign Application Priority Data
Jul. 7, 2017    (JP) .................................. 2017-133767

(51) Int. Cl.
*F03D 7/02*    (2006.01)
*F03D 17/00*   (2016.01)
(Continued)

(52) U.S. Cl.
CPC ......... *F03D 7/0284* (2013.01); *F03D 7/0272* (2013.01); *F03D 7/048* (2013.01); *F03D 17/00* (2016.05); *F03D 80/50* (2016.05)

(58) Field of Classification Search
CPC ...... F03D 7/0284; F03D 7/0272; F03D 80/50; F03D 7/048; F03D 17/00
See application file for complete search history.

(56) References Cited

U.S. PATENT DOCUMENTS 7,677,869 B2    3/2010    Martinez De Lizarduy Romo et al.
7,895,018 B2    2/2011    Nies
(Continued)

FOREIGN PATENT DOCUMENTS

EP    2418620 A1    2/2012
EP    2667021 A1    11/2013
(Continued)

OTHER PUBLICATIONS

Office Action for Japanese Application No. 2017-133767 dated Aug. 3, 2018; 3 pp.
(Continued)

*Primary Examiner* — Thomas C Lee
*Assistant Examiner* — Charles Cai
(74) *Attorney, Agent, or Firm* — Hauptman Ham, LLP

(57) ABSTRACT

A data collection system of at least one wind turbine power generating apparatus includes: at least one wind turbine controller including a control part for controlling each wind turbine power generating apparatus, a representative data memory part for storing representative data of at least one parameter indicating a state or operation history of the at least one wind turbine power generating apparatus, and a representative data selection part configured to obtain data of the at least one parameter once in every control calculation cycle and determine whether to store the obtained data as the representative data for every control calculation cycle; and a data collection part configured to collect, from each wind turbine controller, the representative data of the at least one parameter related to the state of each wind turbine power generating apparatus stored in the representative data memory part of each wind turbine controller.

14 Claims, 6 Drawing Sheets

(51) Int. Cl.
*F03D 7/04* (2006.01)
*F03D 80/50* (2016.01)

(56) References Cited

U.S. PATENT DOCUMENTS

| | | |
|---|---|---|
| 7,948,103 B2 | 5/2011 | Mixter, Jr. |
| 8,041,540 B2 | 10/2011 | Kerber et al. |
| 8,150,641 B2 | 4/2012 | Morjaria et al. |
| 8,219,356 B2 | 7/2012 | Mihok et al. |
| 8,230,266 B2 | 7/2012 | Hamby et al. |
| 8,433,539 B2 | 4/2013 | Ishioka et al. |
| 8,433,541 B2 | 4/2013 | Altemark |
| 8,442,778 B2 | 5/2013 | Bechhoefer et al. |
| 8,874,276 B2 | 10/2014 | Garcia |
| 8,977,403 B2 | 3/2015 | Ichinose |
| 2009/0299697 A1* | 12/2009 | Hamby ............... F03D 7/0224 702/182 |
| 2010/0004878 A1* | 1/2010 | Volanthen ............ F03D 1/065 702/42 |
| 2010/0023887 A1 | 1/2010 | Rambosek et al. |
| 2010/0268849 A1* | 10/2010 | Bengtson ............. G05B 15/02 709/248 |
| 2010/0280872 A1* | 11/2010 | Scholte-Wassink ................ G06Q 10/06311 705/7.13 |
| 2011/0313726 A1 | 12/2011 | Parthasarathy et al. |
| 2012/0041716 A1 | 2/2012 | Higginbotham et al. |
| 2013/0317782 A1 | 11/2013 | Knudsen et al. |
| 2014/0133981 A1* | 5/2014 | Frey ..................... G01N 29/14 416/1 |
| 2015/0115609 A1 | 4/2015 | Bohlen et al. |
| 2015/0137520 A1* | 5/2015 | Garcia ................ H02J 3/1885 290/44 |
| 2015/0381443 A1 | 12/2015 | Du Plessis |
| 2016/0010628 A1 | 1/2016 | Dhar et al. |
| 2017/0023438 A1 | 1/2017 | Bechhoefer et al. |
| 2017/0370348 A1* | 12/2017 | Wilson .................. F03D 17/00 |
| 2018/0045666 A1* | 2/2018 | Sims .................. G01N 27/286 |
| 2018/0173205 A1* | 6/2018 | Miller ............... G05B 19/0426 |
| 2018/0187651 A1* | 7/2018 | Frydendal ............ F03D 7/0292 |
| 2018/0253084 A1* | 9/2018 | Diaz ................ G05B 19/0426 |

FOREIGN PATENT DOCUMENTS

| | | |
|---|---|---|
| JP | 2015-512480 A | 4/2015 |
| JP | 2016-127643 A | 7/2016 |
| JP | 2017-89590 A | 5/2017 |

OTHER PUBLICATIONS

Extended European Search Report for European Application No. 18164198.6 dated Oct. 4, 2018; 8pp.

Office Action for European Application No. 18164198.6 dated Sep. 19, 2019; 6pp.

\* cited by examiner

DATA COLLECTION SYSTEM AND METHOD FOR WIND TURBINE POWER GENERATION FACILITY, AND WIND TURBINE POWER GENERATION FACILITY

RELATED APPLICATIONS

The present application claims priority to Japanese Application Number 2017-133767, filed Jul. 7, 2017, the disclosure of which is hereby incorporated by reference herein in its entirety.

TECHNICAL FIELD

The present disclosure relates to a data collection system and a data collection method for a wind turbine power generation facility, and a wind turbine power generation facility.

BACKGROUND ART

To monitor the state of a wind turbine, for instance, data indicating the state of the wind turbine is collected.

For instance, Patent Document 1 discloses a system for obtaining operation data of a wind turbine during a shutdown of the wind turbine.

In the system as disclosed in Patent Document 1, a wind turbine controller obtains operation data such as output, vibration, and the like. During a shutdown of the wind turbine, for a predetermined period of time before and after the shutdown of the wind turbine, the wind turbine controller obtains operation data at a predetermined sampling rate, and the obtained data is stored in the data buffer of the wind turbine controller. The data stored in the data buffer is transmitted to a work station for data analysis.

CITATION LIST

Patent Literature

Patent Document 1: U.S. Pat. No. 8,230,266B

SUMMARY

Meanwhile, normally, the state of the wind turbine is monitored by continuously obtaining and storing temporal data indicating the state of the wind turbine or the like for a predetermined period of time at a predetermined sampling rate, and analyzing the stored data.

As described above, in a case where the temporal data obtained continuously at a predetermined sampling rate is used in state monitoring of the wind turbine, the volume of data to be processed is extremely high. Thus, there is a high communication load for transmitting the stored data to a calculator for analysis or the like, or the data analysis for state monitoring is complex.

Furthermore, in some cases, instead of analyzing all of the temporal data obtained and stored continuously for a predetermined period at a predetermined sampling rate as described above, useful data (e.g. minimum or maximum value of data in a predetermined period) for state monitoring of the wind turbine is selected from the stored data, and this data alone is used in analysis. At this time, if the above described sampling period is relatively long, the obtained and stored data is coarse, and thus the selected data may fail to accurately represent the state or the operation history of the wind turbine power generating apparatus.

In view of the above issue, an object of at least one embodiment of the present invention is to provide a data collection system and a data collection method for a wind turbine power generation facility, as well as a wind turbine power generation facility, capable of collecting data which accurately represents the state or the operation history of the wind turbine power generating apparatus, while reducing communication load and simplifying data analysis.

(1) A data collection system of a wind turbine power generation facility including at least one wind turbine power generating apparatus, according to at least one embodiment of the present invention, includes: at least one wind turbine controller which includes a control part for controlling each of the at least one wind turbine power generating apparatus, a representative data memory part for storing representative data related to at least one parameter indicating a state or an operation history of the at least one wind turbine power generating apparatus, and a representative data selection part configured to obtain data related to the at least one parameter once in every control calculation cycle and determine whether to store the obtained data of the at least one parameter as the representative data of the at least one parameter in the representative data memory part for every control calculation cycle; and a data collection part configured to collect, from each of the at least one wind turbine controller, the representative data of the at least one parameter related to the state of each of the at least one wind turbine power generating apparatus stored in the representative data memory part of each of the at least one wind turbine controller.

The wind turbine controller is a part that presides control of the wind turbine power generating apparatus, and thus holding a parameter indicating the state or the operation history of the wind turbine power generating apparatus per each control calculation cycle.

Thus, with the wind turbine controller according to the above (1), the wind turbine controller obtains the data of such parameter for each control calculation cycle of the control part, and the representative data selection part determines whether to store the data as the representative data. Furthermore, the representative data memory part of the wind turbine controller is configured to store the data determined as necessary to be stored as the representative data by the representative data selection part. Thus, the representative data stored as described above in the representative data memory part (e.g. the minimum value or the maximum value of data in a predetermined period) is obtained from fine data corresponding to each control calculation cycle, thus accurately representing the state or the operation history of the wind turbine power generating apparatuses, and being useful for monitoring of the wind turbine power generating apparatuses.

Furthermore, the data collection part collects the representative data from the representative data memory part, and thus it is possible to reduce communication load and easily perform subsequent data analysis, as compared to a case in which data is directly taken out from the wind turbine controller in each control calculation cycle.

Thus, with the above configuration (1), by using the plurality of sets of representative data collected as described above, it is possible to monitor the state of the wind turbine power generating apparatus appropriately through facilitated data analysis while reducing communication load.

(2) In some embodiments, in the above configuration (1), the representative data selection part is configured to determine, when an event related to the at least one wind turbine power generating apparatus occurs, that it is necessary to store, in the representative data memory part, data satisfying a predetermined condition from among the data at the time of occurrence of the event or the data in a period including before and after the time of occurrence of the event, as the representative data.

Occurrence of events related to the wind turbine power generating apparatus is related to the control calculation cycle of the wind turbine controller. Thus, with the above configuration (2), the representative data is selected with reference to the occurrence time of an event, and thus it is possible to set a selection condition for the representative data accurately in line with the time of occurrence of a previous event, or the time of occurrence of an event in another wind turbine. Thus, it is possible to monitor the state of the wind turbine power generation facility more appropriately.

(3) In some embodiments, in the above configuration (2), the event is at least one of a starting, a shutdown, a connection to an electric grid, a disconnection from the electric grid, a detection of a state change, trip, or a pre-set command to start recording during shutdown, of the at least one wind turbine power generating apparatus.

With the above configuration (3), it is possible to appropriately determine the state of the wind turbine power generating apparatus when a predetermined event occurs in the wind turbine power generating apparatus. Accordingly, for instance, it is possible to perform health check of a component during a shutdown or a startup of the wind turbine power generating apparatus, and investigate the cause or influence of an abnormality event of the wind turbine power generating apparatus in case such an event occurs.

(4) In some embodiments, in the above configuration (2), the event is an excess of a load applied to the at least one wind turbine power generating apparatus over a predetermined value.

With the above configuration (4), it is possible to appropriately determine the state of the wind turbine power generating apparatus when a load applied to the wind turbine power generating apparatus exceeds a predetermined value.

In some embodiments, in the above configuration (2), the event is an excess of a change amount of a system voltage of an electric power system to which the at least one wind turbine power generating apparatus is connected over a predetermined value.

With the above configuration (5), it is possible to appropriately determine the state of the wind turbine power generating apparatus when a change amount of 5 the system voltage of the utility grid to which the wind turbine power generating apparatus is connected exceeds a predetermined value. Accordingly, it is possible to determine the state of the utility grid, or whether continuous operation of the wind turbine power generating apparatus is performed by Low Voltage Ride Through ("LVRT") function, for instance, when a voltage dip occurs in the utility grid.

(6) In some embodiments, in any one of the above configurations (2) to (5), the representative data memory part is configured to store the time of occurrence of the event obtained by an internal clock of the control part, together with the representative data selected by the representative data selection part, every time the event occurs.

With the above configuration (6), the time of occurrence of an event is obtained with the internal clock of the control part, and thus it is possible to obtain and store the accurate time of occurrence of an event by using the internal clock of the control part to obtain the occurrence time of an event related to the control calculation cycle of the wind turbine controller. Accordingly, it is possible to set a selection condition for the representative data accurately in line with the time of occurrence of a previous event, or the time of occurrence of an event in another wind turbine. Thus, it is possible to monitor the state of the wind turbine power generation facility more appropriately.

(7) In some embodiments, in any one of the above configurations (2) to (6), the data collection system further includes a state monitoring part configured to monitor the state of the wind turbine power generating apparatus on the basis of the representative data collected by the data collection part. The representative data memory part is configured to store the representative data selected by the representative data selection part every time the event occurs. The data collection part is configured to collect a plurality of sets of the representative data stored in the representative data memory part every time the event occurs. The state monitoring part is configured to detect an abnormality of the at least one wind turbine power generating apparatus by comparing the plurality of sets of the representative data.

With the above configuration (7), representative data selected and stored every time an event occurs for a plurality of previous events in the wind turbine power generating apparatuses is compared, and thus it is possible to accurately determine the state of the wind turbine power generating apparatuses every time each event occurs with simple data analysis, and detect an abnormality of the wind turbine power generating apparatuses.

(8) In some embodiments, in any one of the above configurations (1) to (7), the data collection system further includes a state monitoring part configured to monitor the state of the wind turbine power generating apparatus on the basis of the representative data collected by the data collection part. The wind turbine power generation facility comprises a plurality of wind turbine power generation apparatuses. The data collection part is configured to collect the representative data stored in the representative data memory part of each of the plurality of wind turbine power generating apparatuses. The state monitoring part is configured to detect an abnormality of the at least one wind turbine power generating apparatus by comparing the representative data of the plurality of wind turbine power generating apparatuses.

With the above configuration (8), by comparing the representative data selected and stored in the plurality of wind turbine power generating apparatuses, it is possible to accurately determine the state of each of the wind turbine power generating apparatuses and detect an abnormality of the wind turbine power generating apparatuses.

(9) In some embodiments, in any one of the above configurations (1) to (8), the data collection system further includes a local network to which the at least one wind turbine controller is connected. A calculator connected to the local network, serving as the data collection part, is configured to collect the representative data from each of the at least one wind turbine controller via the local network.

With the above configuration (9), a calculator connected to the local network is configured to collect representative data from each wind turbine via the network. Thus, even in a case where a large number of wind turbine power generating apparatuses are provided, it is possible to collect the representative data of each wind turbine power generating apparatus readily.

(10) In some embodiments, in the above configuration (9), the data collection system further includes a state monitoring part configured to monitor the state of the wind turbine power generating apparatus on the basis of the representative data collected by the data collection part. The local network is connected to the state monitoring part via the Internet. The data collection part is configured to transmit the representative data collected from each of the at least one wind turbine controller to the state monitoring part via the Internet.

With the above configuration (10), the collected representative data is transmitted to the state monitoring part via the Internet, and thus it is possible to perform state monitoring of the wind turbine power generation facility easily even from a place remote from the wind turbine power generation facility.

(11) In some embodiments, in any one of the above configurations (1) to (10), the data collection system further includes a monitoring control part for performing operation control or state monitoring for the at least one wind turbine power generating apparatus. The monitoring control part is configured to receive monitoring control data from the at least one wind turbine power generating apparatus once in every cycle which is longer than the control calculation cycle of the control part.

With the above configuration (11), in addition to state monitoring of the wind turbine power generating apparatus using data obtained in the control calculation cycle of the wind turbine controller, performed is monitoring control using monitoring control data obtained in a cycle longer than the control calculation cycle. Thus, it is possible to determine a temporal change in a longer period related to data which indicates the state or the like of the wind turbine power generating apparatus, and perform state monitoring from a different point of view from a state determination based on representative data at a point of time, which makes it possible to monitor the state of the wind turbine power generating apparatus in more detail.

(12) A wind turbine power generation facility according to at least one embodiment of the present invention includes: at least one wind turbine power generating apparatus; and the data collection system according to any one of claims 1 to 11, configured to collect representative data related to at least one parameter indicating a state or an operation history of the at least one wind turbine power generating apparatus.

With the above wind turbine controller (12), the wind turbine controller obtains the data of such parameter indicating the state or the operation history of the wind turbine power generating apparatus for each control calculation cycle of the control part, and the representative data selection part determines whether to store the data as the representative data. Furthermore, the representative data memory part of the wind turbine controller is configured to store the data determined as necessary to be stored as the representative data by the representative data selection part. Thus, the representative data stored as described above in the representative data memory part (e.g. the minimum value or the maximum value of data in a predetermined period) is obtained from fine data corresponding to each control calculation cycle, thus accurately representing the state or the operation history of the wind turbine power generating apparatuses, and being useful for monitoring of the wind turbine power generating apparatuses.

Furthermore, the data collection part collects the representative data from the representative data memory part, and thus it is possible to reduce communication load and easily perform subsequent data analysis, as compared to a case in which data is directly taken out from the wind turbine controller in each control calculation cycle.

Thus, with the above configuration (12), by using the representative data collected as described above, it is possible to monitor the state of each wind turbine power generating apparatus appropriately through facilitated data analysis while reducing communication load.

(13) A method of collecting data of a wind turbine power generation facility including at least one wind turbine power generating apparatus which includes a wind turbine controller including a control part for controlling each of the at least one wind turbine power generating apparatus, according to at least one embodiment of the present invention, includes: a representative data selection step of obtaining data related to the at least one parameter indicating a state or an operation history of the at least one wind turbine power generating apparatus once in every control calculation cycle of the control part and determining whether to store the obtained data of the at least one parameter as the representative data of the at least one parameter for the control calculation cycle, by using the wind turbine controller; a representative data m step of storing the representative data determined as necessary to be stored in the representative data selection step, by using the wind turbine controller; and a data collection step of collecting, from each of the at least one wind turbine controller, the representative data of the at least one parameter related to the state of each of the wind turbine power generating apparatus stored in the representative data storage step.

Thus, in the above method (13), the wind turbine controller obtains the data of such parameter indicating the state or the operation history of the wind turbine power generating apparatus for each control calculation cycle of the control part, and determines whether to store the data as the representative data. Furthermore, the wind turbine controller stores the data determined as necessary to be stored as the representative data. Thus, the representative data stored as described above in the wind turbine controller (e.g. the minimum value or the maximum value of data in a predetermined period) is obtained from fine data corresponding to each control calculation cycle, thus accurately representing the state or the operation history of the wind turbine power generating apparatuses, and being useful for monitoring of the wind turbine power generating apparatuses.

Furthermore, in the above method (13), the representative data stored in the wind turbine controller is collected, and thus it is possible to reduce communication load and easily perform subsequent data analysis, as compared to a case in which data is directly taken out from the wind turbine controller in each control calculation cycle.

Thus, according to the above method (13), by using the representative data collected as described above, it is possible to monitor the state of each wind turbine power generating apparatus appropriately through facilitated data analysis while reducing communication load.

According to at least one embodiment of the present invention, provided is a data collection system and a data collection method for a wind turbine power generation facility, as well as a wind turbine power generation facility, capable of collecting data which accurately represents the state or the operation history of the wind turbine power generating apparatus, while reducing communication load and simplifying data analysis.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
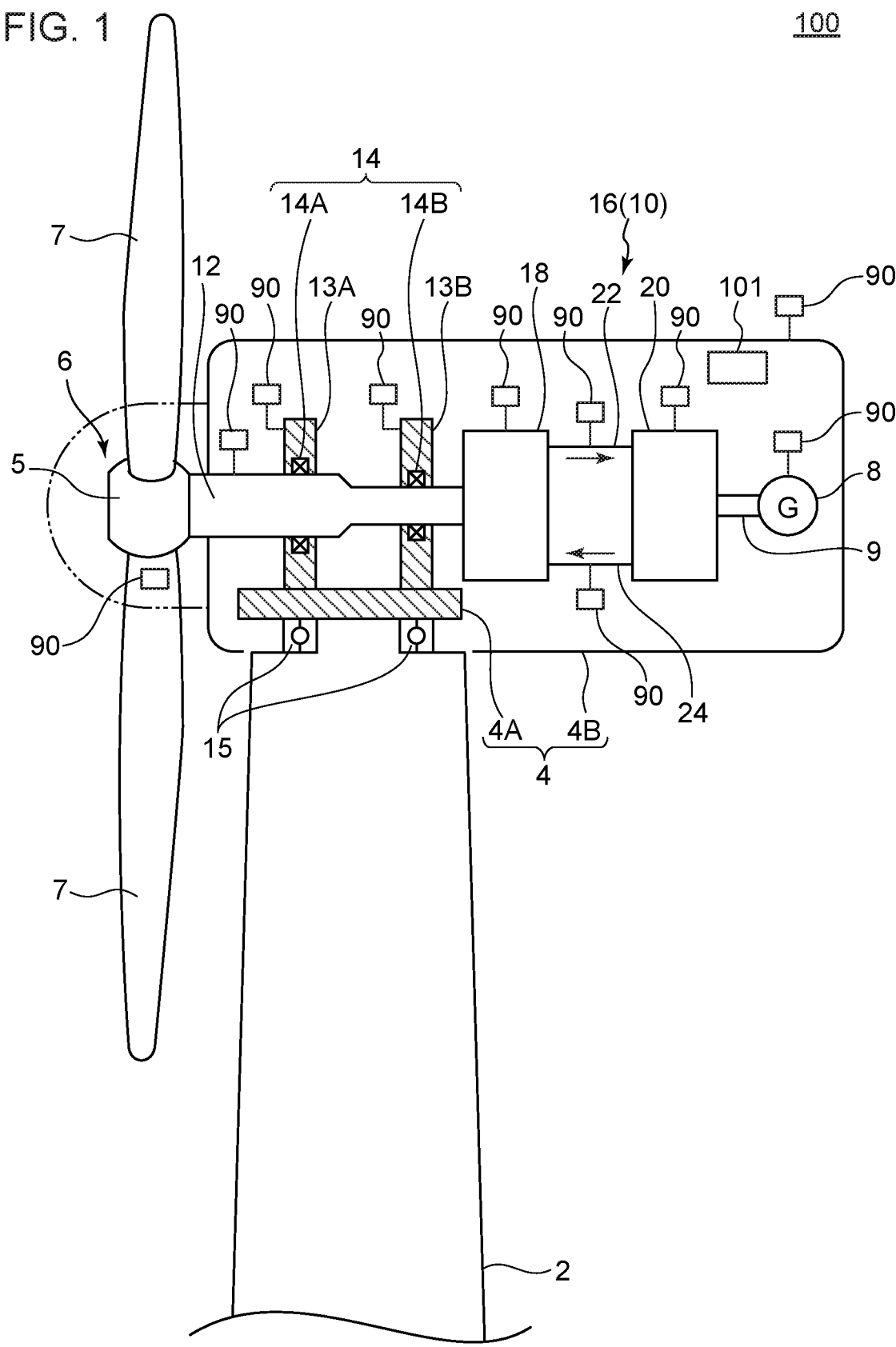
FIG. 1 is a schematic configuration diagram of a wind turbine power generating apparatus included in a wind turbine power generation facility according to some embodiments.

FIG. 1 is a schematic configuration diagram of a wind turbine power generating apparatus included in a wind turbine power generation facility according to some embodiments.

As shown in FIG. 1, the wind turbine power generating apparatus 100 includes a tower 2, a nacelle 4 disposed on the upper part of the tower 2 and supported on the tower 2, a wind turbine rotor 6, and a generator 8 configured to be driven by rotation energy of the wind turbine rotor 6. The wind turbine rotor 6 includes a rotor hub 5 and a blade 7 attached to the rotor hub 5, and is supported rotatably on the nacelle 4.

In the wind turbine power generating apparatus 100 illustrated in FIG. 1, the rotation energy of the rotor 6 is transmitted to the generator 8 via the drive train 10. The drive train 10 of the wind turbine power generating apparatus 100 shown in FIG. 1 includes a main shaft 12 connected to the rotor hub 5 of the wind turbine rotor 6, a main bearing 14 rotatably supporting the main shaft 12, and a transmission 16.

Furthermore, a variety of devices including the main shaft 12 may be housed in the nacelle 4 disposed on the tower 2 erected on water or ground, and covered by a nacelle cover 4B of the nacelle 4.

The tower 2 may support a nacelle mount plate 4A of the nacelle 4 via a yaw rotation bearing 15.

In the wind turbine power generating apparatus 100 shown in FIG. 1, the main shaft 12 is supported on the nacelle 4 by a pair of main bearings 14 (14A, 14B). The pair of main bearings 14 (14A, 14B) may be housed in bearing casings 13 (13A, 13B).

The transmission 16 of the wind turbine power generating apparatus 100 shown in FIG. 1 includes a hydraulic pump 18, a hydraulic motor 20, and a high-pressure line 22 and a low-pressure line 24 connecting the hydraulic pump and the hydraulic motor. The hydraulic pump 18 is configured to be driven by rotation energy of the wind turbine rotor 6. The hydraulic motor 20 is configured to be driven by pressurized oil produced by the hydraulic pump 18, and to input mechanical energy to the generator 8 via the generator shaft 9. The high-pressure line 22 connects the discharge side of the hydraulic pump 18 and the intake side of the hydraulic motor 20, and the low-pressure line 24 connects the discharge side of the hydraulic motor 20 and the intake side of the hydraulic pump 18.

The wind turbine power generating apparatus 100 may include a gear-type speed increasing unit configured to increase the speed of rotation of the main shaft 12 and transmit the rotation to the generator shaft 9.

Alternatively, the wind turbine power generation apparatus 100 may be a direct-drive type wind turbine power generating apparatus configured to drive the generator 8 with rotation of the main shaft 12, not via a drive train.

The wind turbine power generating apparatus 100 includes a wind turbine controller 101 for controlling the wind turbine power generating apparatus 100.

Further, the wind turbine power generating apparatus 100 includes various sensors 90. The sensors 90 may include an anemometer for measuring the wind velocity outside the nacelle, a vibration sensor for measuring vibration of the bearing, temperature sensors for measuring temperatures of the bearing and various devices, a pressure sensor for measuring a pressure of a predetermined location of a hydraulic device, a load sensor for measuring the load applied to the blade 7, a current meter for measuring electric current that runs through the coil of the generator, or the like.

Figure 2:
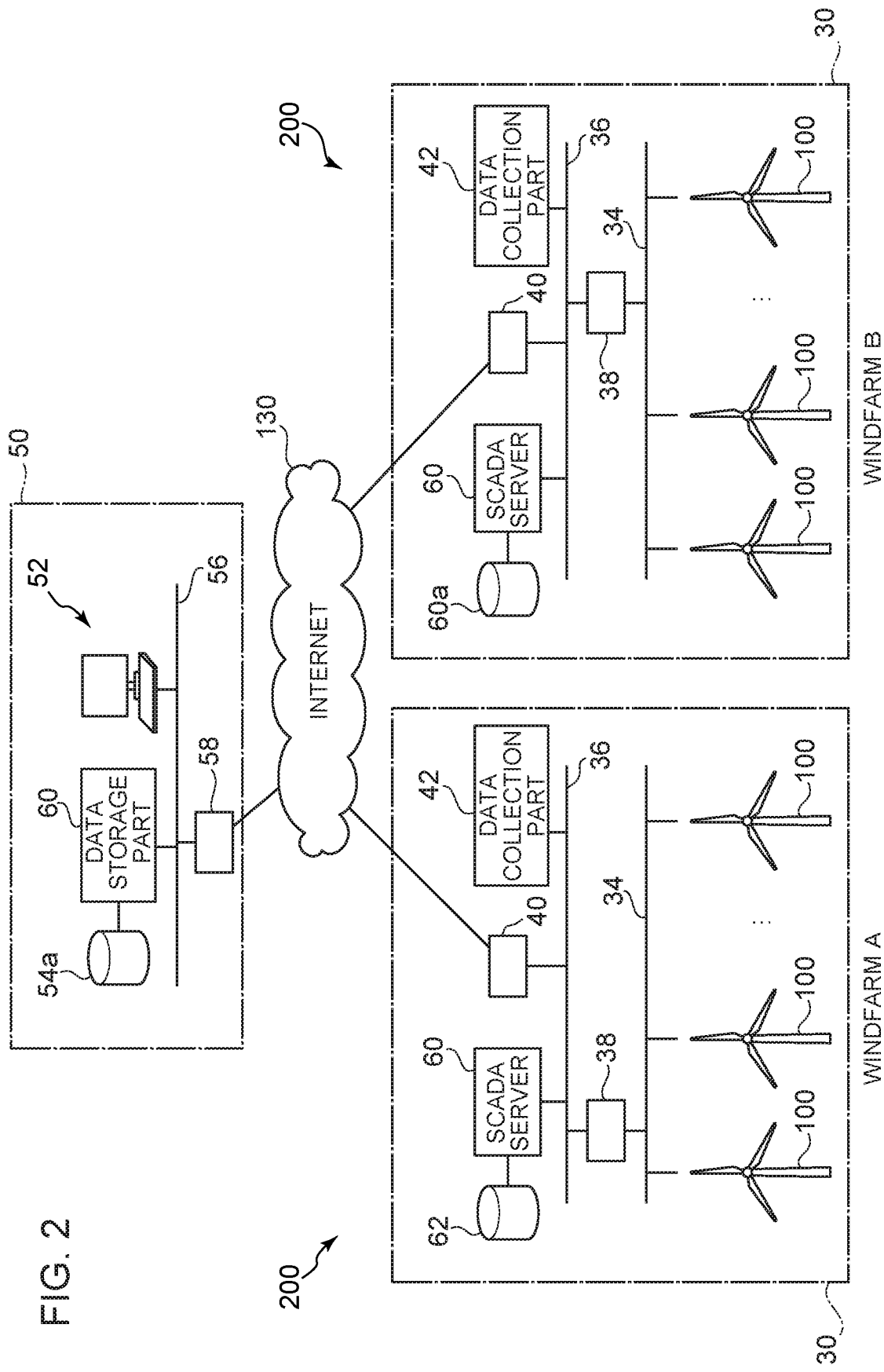
FIG. 2 is an overall configuration diagram of a wind turbine power generation facility according to an embodiment.

FIG. 2 is an overall configuration diagram of a wind turbine power generation facility according to an embodiment. As shown in FIG. 2, the wind turbine power generation facility 1 includes at least one wind turbine power generating apparatus 100 and a data collection system 200. The data collection system 200 includes a wind turbine controller 101 (see FIGS. 1 and 3) provided for each wind turbine power generating apparatus 100 and a data collection part 42, and is configured to collect representative data RD related to at least one parameter indicating the state or the operation history of each wind turbine power generating apparatus 100. The representative data RD (described below in detail) can be used in state monitoring of the wind turbine power generating apparatus 100.

In the wind turbine power generation facility 1, the at least one wind turbine power generating apparatus 100 may constitute a wind farm 30, and the wind turbine power generation facility 1 may include a plurality of wind farms 30. In an illustrative embodiment shown in FIG. 2, the wind turbine power generation facility 1 includes two wind farms 30 (wind farm A and wind farm B), and each wind farm 30 includes a plurality of wind turbine power generating apparatuses 100 which belong thereto. Further, the data collection system 200 of the wind turbine power generation facility 1 may be configured to collect the representative data RD related to each of the plurality of wind turbine power generating apparatuses 100 belonging to each wind farm 30.

Each wind farm 30 includes a local area network (LAN), and the devices constituting the wind farm 30 are connected to the LAN. As shown in FIG. 2, the LAN of each wind farm 30 may include a wind turbine network 34 to which the wind turbine controller 101 of each wind turbine power generating apparatus 100 is connected, and a data collection network 36 to which the data collection part 42 is connected. In the embodiment shown in FIG. 2, the wind turbine network 34 and the data collection network 36 are connected via a switch 38 (network device). In other words, the data collection part 42 is connected to the wind turbine network 34 via the switch 38, and is configured to collect the above described representative data RD from each wind turbine controller 101.

The data collection part 42 may include a calculator such as a personal computer. Further, as shown in FIG. 2, the data collection part 42 is provided for each of the wind farms 30.

The data collection system 200 may further include a state monitoring part 50 for monitoring the state of the wind turbine power generating apparatuses 100. The state monitoring part 50 may be configured to monitor the state of the wind turbine power generating apparatuses MO on the basis of the representative data RD collected by the data collection part 42.

In the illustrative embodiment shown in FIG. 2, the state monitoring part 50 includes a data storage part 54 and a data analysis part 52. The data analysis part 52 may include a calculator such as a personal computer. The data storage part 54 may include a storage device 54a capable of storing data.

Furthermore, in the illustrative embodiment shown in FIG. 2, the state monitoring part 50 includes a state monitoring network (LAN) 56, and the data storage part 54 and the data analysis part 52 are each connected to the state monitoring network 56. The state monitoring network 56 is connected to the LAN of each wind farm 30 via the Internet 130. More specifically, the state monitoring network 56 and the data collection network 36 of each wind farm 30 are connected to the Internet 130 via rooters 58, 40, respectively.

Thus, the representative data RD of each wind turbine power generating apparatus 100 collected by the data collection part 42 of each wind farm 30 is transmittable to the state monitoring part 50 from the data collection part 42 via the Internet 130.

Further, as shown in FIG. 2, the data collection system 200 may further include a monitoring control part 60 for performing operation control or state monitoring for the wind turbine power generating apparatuses 100.

The monitoring control part 60 may include, for instance, a supervisory control and data acquisition (SCADA) for collecting data that indicates the operation state of the wind turbine power generating apparatuses 100 for control, a condition monitoring system (CMS) for monitoring the condition (state) of the wind turbine power generating apparatuses 100.

In the illustrative embodiment shown in FIG. 2, the data collection system 200 includes a SCADA server for performing a control by collecting data that indicates the operational condition of the wind turbine power generating apparatuses 100, as the monitoring control part 60. Furthermore, the SCADA server (monitoring control part 60) shown in FIG. 2 may include a storage device 60a for storing collected data.

Further, as shown in FIG. 2, the monitoring control part 60 may be provided for each of the wind farms 30 constituting the wind turbine power generation facility 1.

Figure 3:
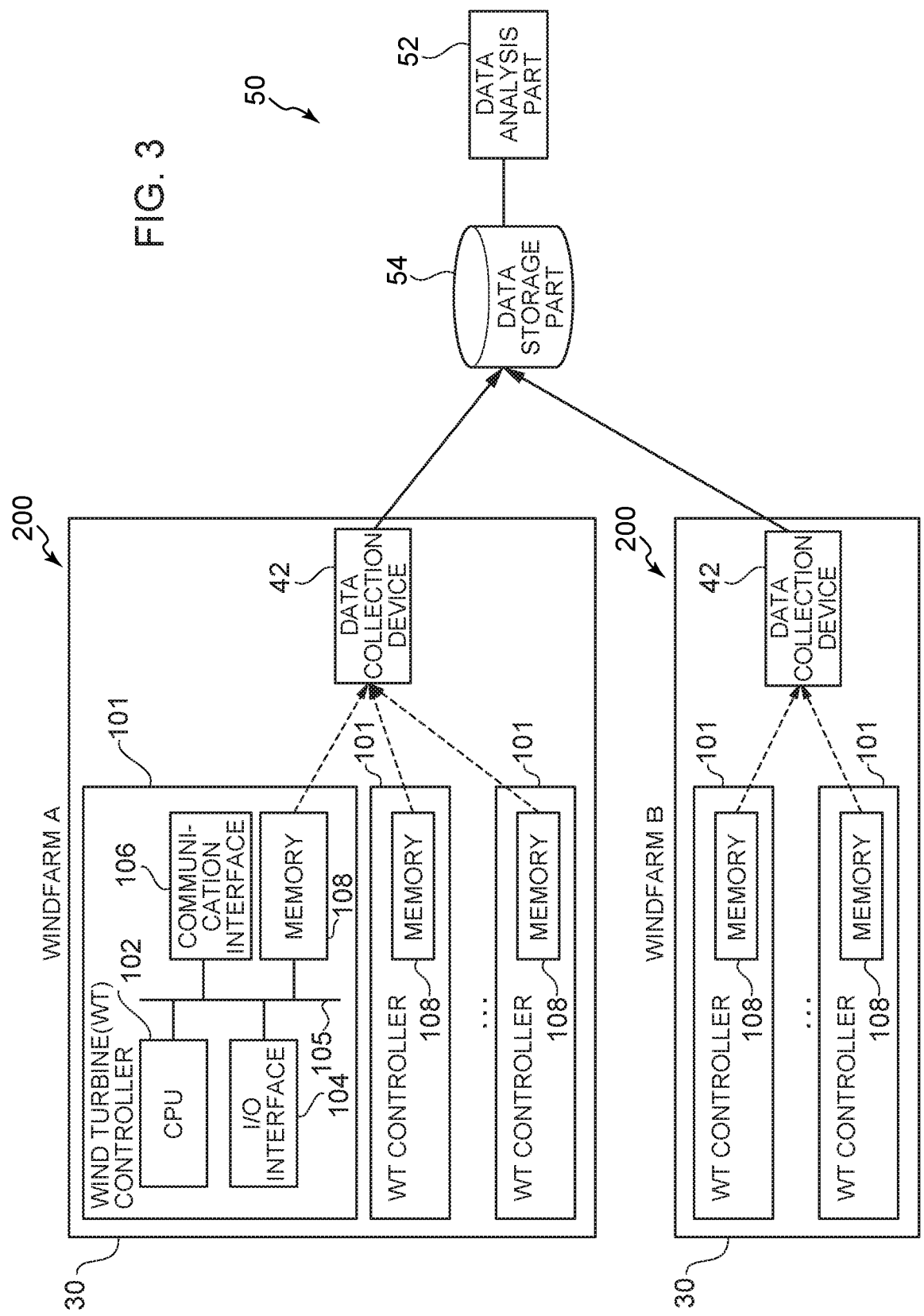
FIG. 3 is a physical configuration diagram of a data collection system according to an embodiment.
Figure 4:
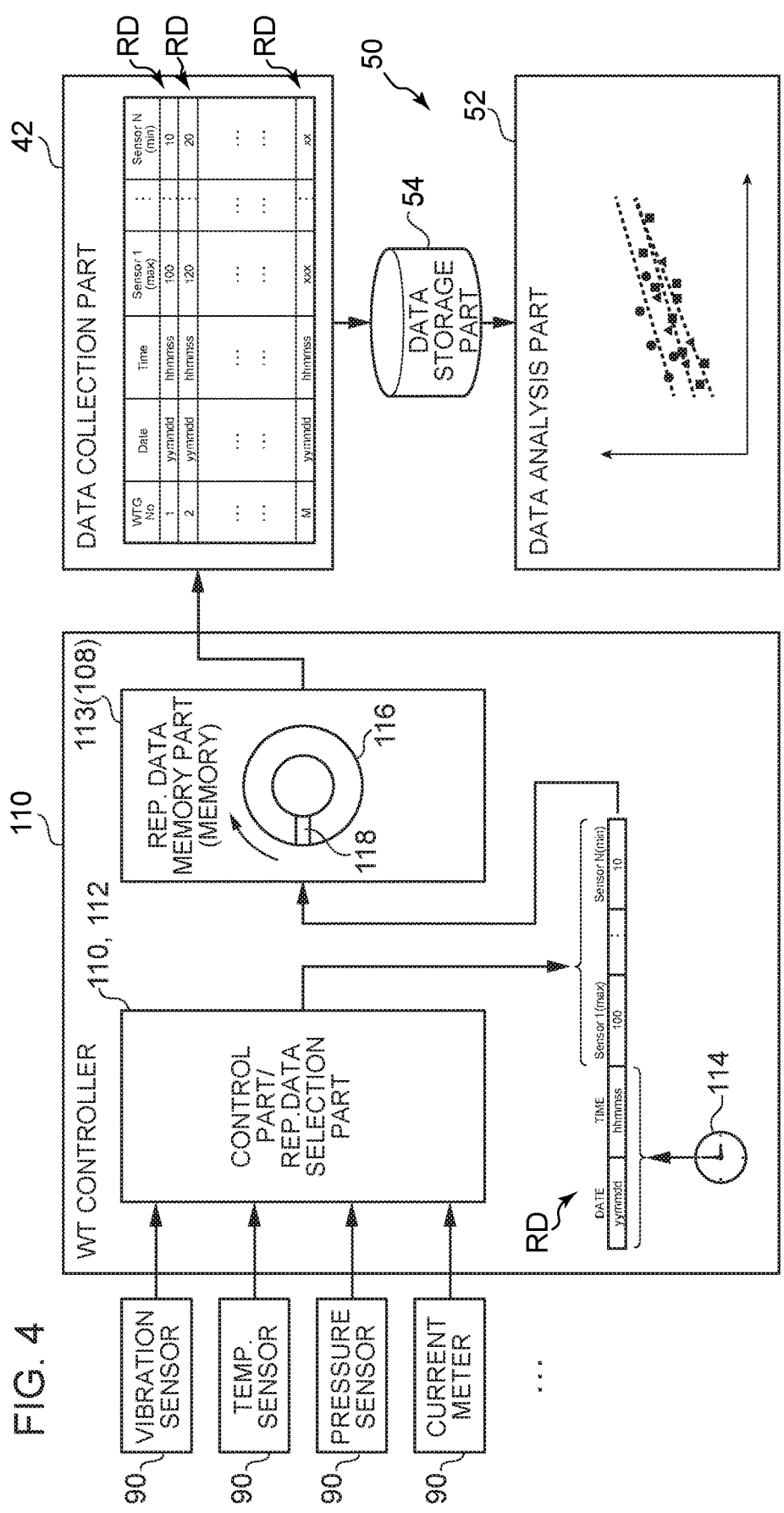
FIG. 4 is a diagram showing the functional configuration and the flow of process, of the data collection system shown in FIG. 3.

FIG. 3 is a physical configuration diagram of the data collection system 200 according to an embodiment. FIG. 4 is a diagram showing the functional configuration and the flow of process, of the data collection system 200 shown in FIG. 3.

In FIGS. 3 and 4, the network components shown in FIG. 2 (LANs 34, 36, 56, the Internet 130, and network devices such as the rooters 40, 58 and the switch 38) are not shown.

As described above, the data collection system 200 includes the wind turbine controllers 101 and the data collection parts 42 provided for the respective wind turbine power generating apparatuses 100.

As shown in FIG. 3 for instance, each wind turbine controller 101 includes a central processing unit (CPU) 102, an I/O interface 104, a communication interface 106, and a memory device 108, which are interconnected by a bus 105, so as to be communicable with one another via the bus 105.

The CPU 102 is configured to process information received from various sensors 90 (e.g. load sensor, vibration sensor, temperature sensor, pressure sensor, current meter).

The memory device 108 is used to store and transmit information and commands to be processed by the CPU 102. Furthermore, the memory device 108 is used to store various types of data received from the sensors 90. The memory device 108 may include a volatile random access memory (RAM) and/or a non-volatile RAM (NVRAM).

The I/O interface 104 is an interface that enables connection between the wind turbine controller 101 and a variety of external devices including the various sensors 90. The I/O interface 104 may have a function to convert analog signals received from the sensors 90 into digital signals that can be processed by the CPU 102.

The communication interface 106 is an interface that enables communication between the wind turbine controller 101 and the network to which the wind turbine controller 101 is connected. For instance, when data stored in the memory device 108 is transmitted to another device (e.g. data collection part 42) via the network, the data is transmitted to the other device via the communication interface 106.

Furthermore, as described above, while the wind turbine controller 101 is provided for each of the wind turbine power generating apparatuses 100, FIG. 3 shows a specific configuration only for one wind turbine controller 101, from among the plurality of wind turbine controllers 101 included in the wind farm A, namely the CPU 102, the I/O interface 104, the communication interface 106, and the bus 105. For the remaining wind turbine controllers 101, only the memory device 108 is shown and other components are omitted to simplify the drawing. Furthermore, FIG. 4 shows only one wind turbine controller 101 from among the wind turbine controllers 101 provided for the respective wind turbine power generating apparatuses 100, and the other wind turbine controllers 101 are not shown.

As shown in FIG. 4, the wind turbine controller 101 includes a control part 110 for controlling the wind turbine power generating apparatus 100, a representative data selection part 112, and a representative data memory part 113.

The control part 110 is configured to, once in every control calculation cycle, perform calculation for control of the wind turbine power generating apparatus 100 (e.g. control of blade pitch angle, yaw angle, generator rotation speed) and send control signals to each part of the wind turbine power generating apparatus 100 (e.g. pitch actuator, yaw motor, or hydraulic transmission) on the basis of the result of the control calculation.

In other words, the wind turbine controller 101 is a part that presides control of the wind turbine power generating apparatus 100, and thus holding a parameter indicating the state or the operation history of the wind turbine power generating apparatus 100 per each control calculation cycle.

The representative data selection part 112 is configured to obtain data related to at least one parameter indicating the state or the operation history of the wind turbine power generating apparatus 100 once in every control calculation cycle of the control part 110, and determine whether to store the obtained data as the representative data RD of the parameter in the representative data memory part 113, for every control calculation cycle of the control part 110.

The representative data memory part 113 is configured to store the data determined as necessary to be stored by the representative data selection part 112 as the representative data RD of the above parameter.

The control part 110 and the representative data selection part 112. (see FIG. 4) may include the CPU 102, the I/O interface 104, the memory device 108 (see FIG. 3), and the like.

Furthermore, the representative data memory part 113 (see FIG. 4) may include the memory device 108 (see FIG. 3). The representative data memory part 113 may include a NVRAM.

In some embodiments, the representative data selection part 112 is configured to, when an event related to operation of the wind turbine power generating apparatus 100 occurs, determine that it is necessary to store, in the representative data memory part 113, data satisfying a predetermined condition, from among the data at the time of occurrence of the event or the data in a period including before and after the time of occurrence, as the representative data RD.

Occurrence of an event related to operation of the wind turbine power generating apparatus 100 is related to the control calculation cycle of the wind turbine controller 101. Thus, by selecting the representative data RD with reference to the time of occurrence of an event, it is possible to set a selection condition for the representative data RD accurately in line with the time of occurrence of a previous event, or the time of occurrence of an event in another wind turbine power generating apparatus 100.

For instance, in an embodiment, the representative data selection part 112 may be configured to determine whether to store data from a start to a shutdown of the wind turbine power generating apparatus 100 (e.g. a course of continuous operation of the wind turbine power generating apparatus 100) as the representative data RD, provided that an event includes a start and a shutdown after the start of the wind turbine power generating apparatus 100. Furthermore, the representative data selection part 112 may be configured to determine that it is necessary to store, in the representative data memory part 113 as the representative data RD, the maximum value or the minimum vale of data (e.g. load applied to the blade 7 or pressure at a predetermined location in the hydraulic device) related to the at least one parameter indicating the state or the operation history of the wind turbine power generating apparatus 100 obtained in every control calculation cycle during the above described operation period.

The load applied to the blade 7 may be obtained by the load sensor 90 attached to the blade 7. Further, the pressure at a predetermined location in a hydraulic device may be obtained by a pressure sensor.

As described above, the data determined as necessary to be stored as the representative data RD by the representative data selection part 112 is stored in the representative data memory part 113 as the representative data RD.

The representative data memory part 113 may include a memory region provided. in the memory device 108, in form of a ring buffer 116 including a plurality of buffers 118 arranged in a ring shape.

Each buffer 118 may be configured to store a set of data including at least one representative data RD (e.g. the maximum value of the load applied to the blade 7, and the maximum value and the minimum value of the pressure at a predetermined location in a hydraulic device, as described above) related to a single event (see the representative data RD in FIG. 4).

For instance, in a case where a ring buffer 116 including N buffers 118 capable of storing M types of data logically arranged in a ring shape is used as the representative data memory part 113, the ring buffer 116 can store at most N sets of representative data RD corresponding to N times of events (e.g. corresponding to N periods of continuous operation of the wind turbine power generating apparatus 100).

The representative data RD stored in the ring buffer 116 may be processed as follows. For instance, in the ring buffer 116, the representative data RD corresponding to the first event is stored in the first buffer 118, the representative data RD corresponding to the second event in the second buffer 118, the representative data RD corresponding to the N-th event in the N-th buffer 118, and so on. The representative data RD corresponding to the N+1-th event is stored (overwritten) in the first buffer previously storing the representative data RD corresponding to the first event.

Accordingly, by using the ring buffer 116, it is possible to easily manage a plurality of sets of representative data RD corresponding to a plurality of events.

Further, a plurality of ring buffers 116 may be provided in accordance with the types of events for which data is to be obtained. For instance, two ring buffers 116 may be provided corresponding to two types of events for obtaining data, where the first event includes a start and a shutdown after the start of the wind turbine power generating apparatus 100, in case of which the data obtaining period is a period from a start to a shutdown of the wind turbine power generating apparatus 100 (i.e. a course of continuous operation of the wind turbine power generating apparatus 100), and the second event includes an excess of a load applied to the blade 7 over a threshold (becoming an excessive blade load), in case of which the data obtaining period is a period from the time of occurrence of an excess blade load to the time after elapse of a predetermined time thereafter.

By preparing a plurality of ring buffers 116 for respective events as described above, it is possible to manage data in the memory device 108 easily.

The representative data memory part 113 may be configured to store the time of occurrence of the event obtained by an internal clock (see FIG. 4) of the control part 110, together with the representative data RD selected by the representative data selection part 112, every time an event occurs. The time of occurrence of an event is related to the control calculation cycle of the wind turbine controller 101, and thus it is possible to obtain the accurate time of occurrence of an event by using the internal clock 114 of the control part 110.

Thus, it is possible to set a selection condition for the representative data RD accurately in line with the time of occurrence of a previous event, or the time of occurrence of an event in another wind turbine power generating apparatus 100.

As shown in FIGS. 3 and 4, the data collection part 42 is configured to collect the representative data RD of the at least one parameter related to the state of each wind turbine power generating apparatus 100 stored in the representative data memory part 113 (memory device 108) of each wind turbine controller 101, from each wind turbine controller 101.

The data collection part 42 may be configured to collect the representative data RD stored in the representative data memory part 113 (memory device 108) via the communication interface 106 of the wind turbine controller 101.

Further, the data collection part 42 may be configured to circuit the wind turbine controllers 101 of the plurality of wind turbine power generating apparatuses 100 belonging to the same wind farm 30, and collect the representative data RD from each wind turbine controller.

The circuit of the data collection part 42 through the wind turbine controllers 101 of the wind turbine power generating apparatuses 100 may be performed automatically (e.g. as a regular interval, such as once in a day or a week), or in response to a command issued by an operator to e data collection part 42 at an appropriate timing.

As the data collection part 42 collects the representative data RD obtained from each wind turbine power generating apparatus 100, a plurality of sets of representative data obtained corresponding to previous occurrence of a plurality of events are stored in the data collection part 42, for each of the plurality of wind turbine power generating apparatuses 100. Thus, by comparing the plurality of sets of representative data RD stored as described above, it is possible to monitor the state of each wind turbine power generating apparatus 100.

The state monitoring part 50 is configured to monitor the state of each wind turbine power generating apparatus 100 on the basis of the representative data RD collected by the data collection part 42.

As shown in FIG. 2, the state monitoring part 50 is connected to the data collection part 42 via the Internet 130, and may be configured such that the representative data RD collected by the data collection part 42 is transmitted to the state monitoring part 50 via the Internet 130. In this case, it is possible to monitor the state of the wind turbine power generating apparatuses 100 easily even from a place remote from the wind farm 30.

Alternatively, although not shown, the state monitoring part 50 may be directly connected to the LAN of each wind farm 30, and the state of the wind turbine power generating apparatuses 100 belonging to each find farm 30 may be monitored within the wind farm 30.

In the state monitoring part 50, the representative data RD from the data collection part 42 is stored in the data storage part 54, and the data analysis part 52 may be configured to analyze the representative data RD stored in the data storage part 54 to monitor the state of each wind turbine power generating apparatus 100.

The state monitoring part 50 may be configured to monitor the state of each wind turbine power generating apparatus 100 by performing various analyses such as multiple classification analysis and principal component analysis (PCA).

In some embodiments, the data collection part 42 is configured to collect the plurality of sets of representative data RD stored in the representative data memory part 113 every time an event occurs, and the state monitoring part 50 may be configured to detect an abnormality of the wind turbine power generating apparatuses 100 by comparing the plurality of sets of representative data RD. That is, representative data RD selected and stored every time an event occurs for a plurality of previous events in the wind turbine power generating apparatuses 100 is compared, and thus it is possible to accurately determine the state of the wind turbine power generating apparatuses 100 every time each event occurs with simple data analysis, and detect an abnormality of the wind turbine power generating apparatuses 100.

Furthermore, in some embodiments, the data collection part 42 is configured to collect the representative data RD stored in the representative data memory part 113 of each of the plurality of wind turbine power generating apparatuses 100 belonging to the wind farm 30, and the state monitoring part 50 may be configured to detect an abnormality of the wind turbine power generating apparatuses 100 by comparing the representative data RD of the plurality of wind turbine power generating apparatuses 100. That is, by comparing the representative data RD selected and stored in the plurality of wind turbine power generating apparatuses 100, it is possible to accurately determine the state of each of the wind turbine power generating apparatuses 100 and detect an abnormality of the wind turbine power generating apparatuses 100.

As already described above, the wind turbine controller 101 is a part that presides control of the wind turbine power generating apparatus 100, and holding a parameter indicating the state or the operation history of the wind turbine power generating apparatuses 100 for each control calculation cycle.

Thus, in the above described embodiment, the wind turbine controller 101 obtains the data of such parameter for each control calculation cycle of the control part 110, and the representative data selection part 112 determines whether to store the data as the representative data RD. Furthermore, the representative data memory part 113 of the wind turbine controller 101 is configured to store the data determined as necessary to be stored as the representative data RD by the representative data selection part 112. Thus, the representative data RD stored as described above in the representative data memory part 113 (e.g. the minimum value or the maximum value of data in a predetermined period) is obtained from fine data corresponding to each control calculation cycle, thus accurately representing the state or the operation history of the wind turbine power generating apparatuses 100, and being useful for monitoring of the wind turbine power generating apparatuses 100.

Furthermore, in the above embodiment, the data collection part 42 collects the representative data RD from the representative data memory part 113, and thus it is possible to reduce communication load and easily perform subsequent data analysis, as compared to a case in which data is directly taken out from the wind turbine controller 101 in each control calculation cycle.

Thus, by using the representative data RD collected as described above, it is possible to monitor the state of each wind turbine power generating apparatus 100 appropriately through facilitated data analysis while reducing communication load.

Figure 5:
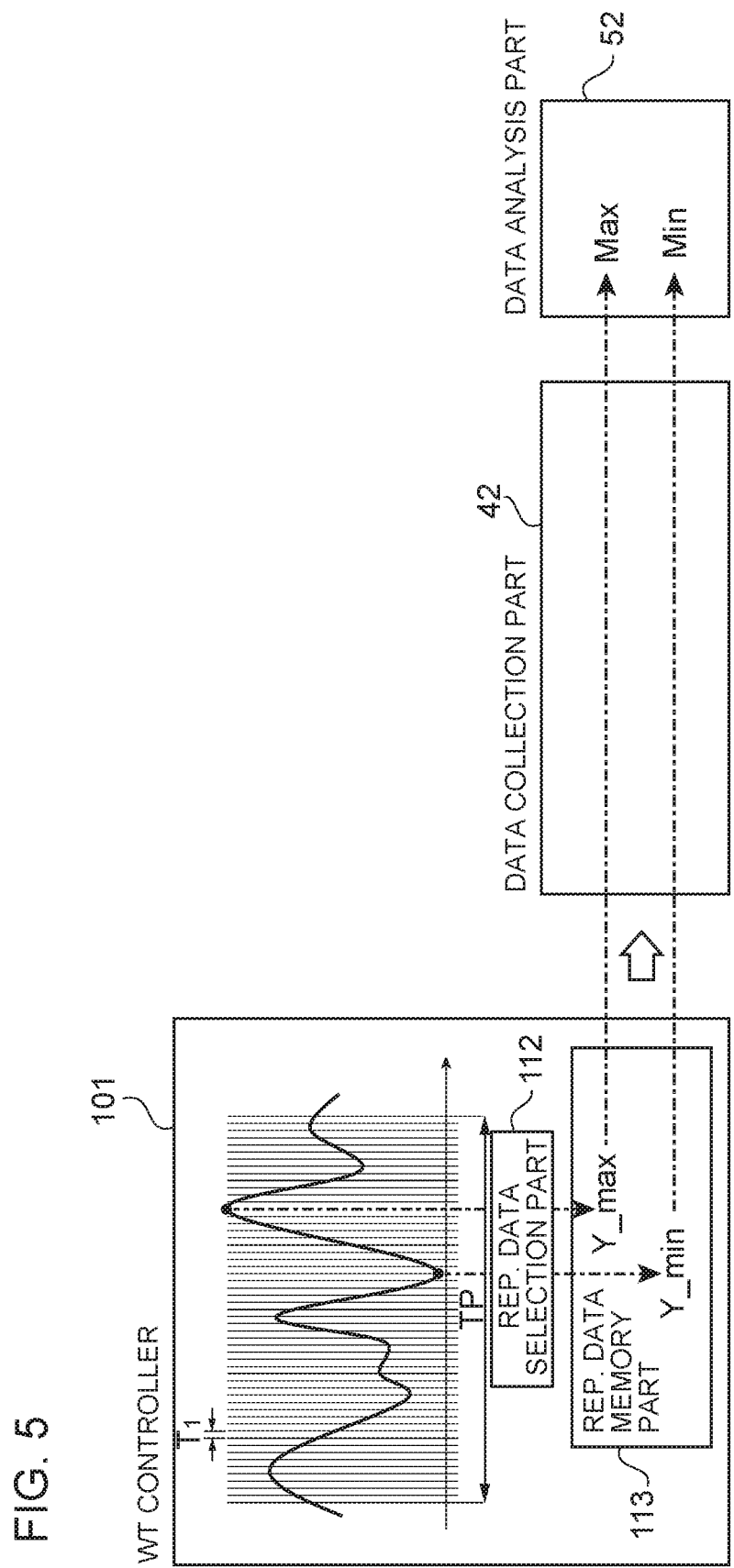
FIG. 5 is a diagram showing a flow of extraction of the maximum value and the minimum value of a parameter indicating an operation state of the wind turbine power generating apparatus with a data collection system according to an embodiment.
Figure 6:
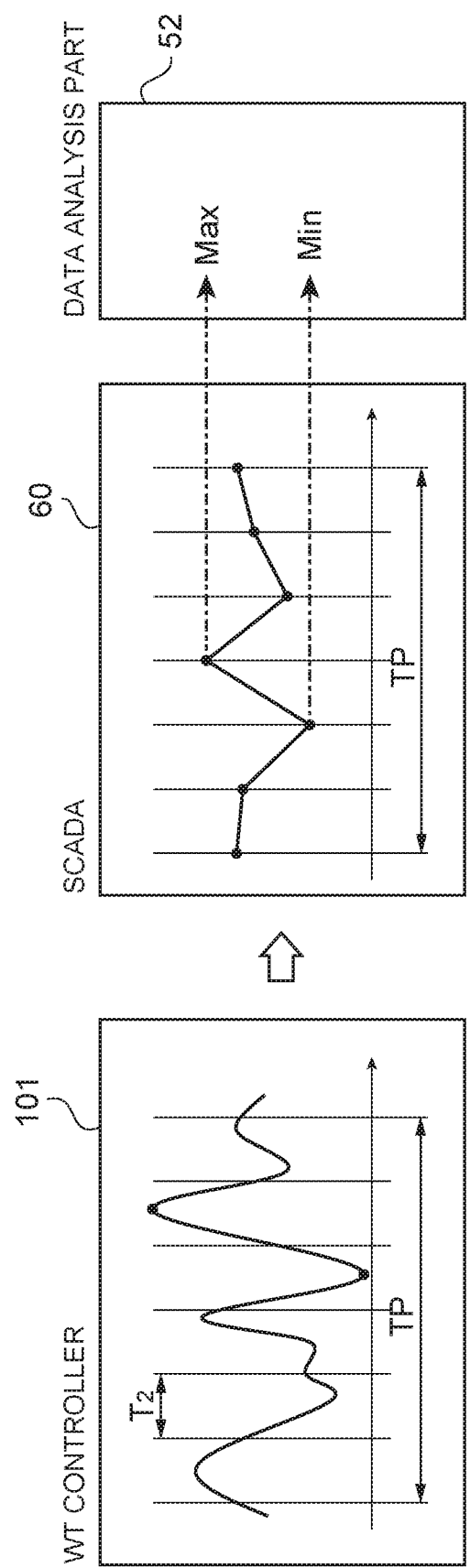
FIG. 6 is a diagram showing a flow of extraction of the maximum value and the minimum value of a parameter indicating an operation state of the wind turbine power generating apparatus with a typical data collection system.

FIG. 5 is a diagram showing a flow of extraction of the maximum value (Max) and the minimum value (Min) of a parameter (e.g. pressure at a predetermined location in a hydraulic device) indicating the operation state of the wind turbine power generating apparatuses 100 with the data collection system 200 according to the above described embodiment. FIG. 6 is a diagram showing a flow of extraction of the maximum value (Max) and the minimum value (Min) of a similar parameter with SCADA serving as a typical data collection system. In both of FIGS. 5 and 6, the maximum value and the minimum value of the parameter are obtained (extracted) to monitor the state of the wind turbine power generating apparatus 100.

As described above, the wind turbine controller 101 obtains a parameter indicating the state or the operation history of the wind turbine power generating apparatus 100 for each control calculation cycle (cycle T1 shown in FIG. 5), and holds the parameter. The control calculation cycle of the wind turbine controller 101 is, for instance, not shorter than 10 ms and not longer than 100 ms, approximately.

Herein, TP is the period in which the maximum value and the minimum value of the parameter of the wind turbine power generating apparatus 100 are evaluated (see FIGS. 5 and 6).

Generally, the data sampling cycle T2 (see FIG. 6) of SCADA is not shorter than 500 ms and not longer than 20 minutes, approximately, and is longer than the control calculation cycle T1 (not shorter than 10 ms and not longer than 100 ms, approximately) of the wind turbine controller 101. Thus, data related to a parameter obtained by the SCADA server (monitoring control part 60) is normally decimated in terms of information (see the SCADA server, or the monitoring control part 60, in FIG. 6). Thus, when data collected by SCADA is analyzed off-line to evaluate the maximum value and the minimum value of the above parameter, the maximum value (Max) and the minimum value (Min) are extracted from data decimated as described above (see the data analysis part 52 in FIG. 6), and thus may be considerably different from the actual maximum and minimum values. Furthermore, normally, data obtained by SCADA is continuously obtained for long time at the predetermined data sampling cycle T2 during operation of the wind turbine power generating apparatuses 100. Thus, an extremely high volume of data is stored in the SCADA server (monitoring control part 60). To obtain a representative value such as the maximum value and the minimum value in a predetermined period related to the above parameter from such an enormous amount of data, a considerable amount of data processing is required.

In contrast, in the above described embodiment (see FIG. 5), the wind turbine controller 101 obtains the data of the parameter for each control calculation cycle T1 of the control part 110, and the representative data selection part 112 determines whether to store the data as the representative data RD. In other words, data of each parameter is input to the wind turbine controller 101 from a sensor or the like for each control calculation cycle T1. Furthermore, for the data (Y), the representative data selection part 112 performs a process "If Y>Y_max, then Y_max=Y, end if" on the maximum value, and a process "if Y<Y_min, then Y_min=Y, end if" on the minimum value (see the representative data selection part 112 in FIG. 5. In accordance with the results of these processes, the representative data RD (i.e. the maximum value Y_max or the minimum value Y_min) are are updated by overwriting in the representative data memory part 113 (see the representative data memory part 133 in FIG. 6). As described above, the data (Y_max and Y_min) determined as necessary to be stored as the representative data RD by the representative data selection part 112 is stored in the representative data memory part 113.

Thus, the representative data stored in the representative data memory part 113 (e.g. the minimum value Y_min or the maximum value Y_max of data in a predetermined period TP) is obtained from fine data corresponding to each control calculation cycle T1, and thus accurately represent the state or the operation history of the wind turbine power generating apparatuses. Thus, it is possible to improve the accuracy of data to be analyzed by the data analysis part 52 (see FIG. 5), and to perform a data extraction process readily.

Furthermore, the representative data determined whether to be stored by the representative data selection part 112 and stored in the representative data memory part 113 may be the maximum value or the minimum value in a predetermined period of a parameter indicating the operation state of the wind turbine power generating apparatus 100, or a statistic quantity such as the average value, standard variation, or the maximum standard variation, for instance, of the parameter in a predetermined period. Alternatively, the representative data may be a value of the parameter at a predetermined time. A predetermined time may be a time after elapse of a predetermined time after connection of the wind turbine power generating apparatus 100 to the utility grid, or the moment of shutdown.

As described above, in some embodiments, the representative data selection part 112 is configured to, when an event related to operation of at least one wind turbine power generating apparatus 100 occurs, determine that it is necessary to store, in the representative data memory part 113, data satisfying a predetermined condition, from among the data related to the above parameter at the time of occurrence or the event of the data in a period including before and after the time of occurrence, as the representative data RD.

Events related to operation of the wind turbine power generating apparatus 100 include, for instance, the following.

In some embodiments, the above described event may be at least one of a start, a shutdown, connection to the utility grid, disconnection from the utility grid, maximum, minimum, detection of a change in the state, trip, or a pre-set command to start recording during a shutdown, of the at least one wind turbine power generating apparatus 100.

In this case, it is possible to appropriately determine the state of the wind turbine power generating apparatus 100 when a predetermined event occurs in the wind turbine power generating apparatus 100. Accordingly, for instance, it is possible to perform health check of a component during a shutdown or a startup of the wind turbine power generating apparatus 100, and investigate the cause or influence of an abnormality event of the wind turbine power generating apparatus 100 in case such an event occurs.

Further, in this case, the following may be used as the representative data RD of a parameter indicating the state or the operation history of the wind turbine power generating apparatus 100.

Time of a start/shutdown, power generation amount per a single startup/shutdown, wind condition, the maximum rotation speed, rated operation time, etc. of the wind turbine power generating apparatus 100.

A temperature value of a device constituting the wind turbine power generating apparatus 100 at the time of connection, the maximum value during operation (from a startup to a shutdown), etc. of the wind turbine power generating apparatus 100.

The minimum value or the maximum value of a measurement value (e.g. pressure) related to a hydraulic device, the maximum value of pressure difference, etc.

Operation time or number of operations of a generator cooling fan from a startup to a shutdown (i.e. during a single operation), etc. of the wind turbine power generating apparatus 100.

The maximum value of the load applied to the blade 7, the maximum rotation speed of the wind turbine rotor, from a startup to a shutdown, etc. of the wind turbine power generating apparatus 100.

Further, in some embodiments, the above described vent is an excess of a load applied to at least one wind turbine power generating apparatus 100 over a predetermined value.

In this case, it is possible to appropriately determine the state of the wind turbine power generating apparatus when a load applied to the wind turbine power generating apparatus 100 exceeds a predetermined value.

In this case, the representative data RD may be the maximum value of the load applied to each of the plurality of blades 7 constituting the wind turbine rotor 6, in a period from the point of time a predetermined time before the point of time when a load applied to the wind turbine power generating apparatus 100 exceeds a predetermined value (i.e. time of occurrence of an event) to the point of time after elapse of a predetermined time after the time of occurrence of the event.

In this case, for instance, for three blades 7 constituting the wind turbine rotor 6, the representative data RD stored for each of a plurality of events is compared, and if the temporal change of the representative data RD of one of the blades 7 is greater than that of the other blades 7, it can be detected that drift may be occurring in the load sensor provided for the one of the blade 7.

Further, in some embodiments, the above described event is an excess of a change amount of the system voltage of the utility grid to which at least one wind turbine power generating apparatus 100 is connected over a predetermined value.

In this case, it is possible to appropriately determine the state of the wind turbine power generating apparatus when a change amount of the system voltage of the utility grid to which the wind turbine power generating apparatus 100 is connected exceeds a predetermined value. Accordingly, it is possible to determine the state of the utility grid, or whether continuous operation of the wind turbine power generating apparatus 100 is performed by LVRT function, for instance, when a voltage dip occurs in the utility grid.

As described above, the representative data RD may be the value of the above described parameter at a point of time a predetermined time before the time when a change amount of the system voltage of the utility grid to which the wind turbine power generating apparatus 100 is connected exceeds a predetermined value (i.e. time of occurrence of an event), or the maximum value and/or the minimum value: of the above parameter in a period from the time of occurrence of the event to the time after elapse of a predetermined time after the time of occurrence of the event.

In this case, the following may be used as a parameter indicating the state or the operation history of the wind turbine power generating apparatus 100.

System voltage reducing time, reactive power supply amount, active power reduction amount, stator current and rotor current, a change amount in the generator rotation speed, etc.

In some embodiments, the data collection system 200 may further include the monitoring control part 60 for performing operation control or state monitoring for the wind turbine power generating apparatuses 100 (see FIG. 2). The monitoring control part 60 is configured to receive monitoring control data from the at least one wind turbine power generating apparatus 100 in a cycle which is longer than the control calculation cycle of the control part 110 of the wind turbine controller 101.

In an embodiment, the monitoring control part 60 may be a supervisory control and data acquisition (SCADA) configured to collect information from an anemometer and various sensors, produce control signals from the collected information and send the control signals to the wind turbine, or configured to analyze collected information and send signals for dynamically and visually displaying the information to a display.

Alternatively, in an embodiment, the monitoring control part 60 may be a condition monitoring system (CMS) configured to collect measurement data indicating vibration of a gear or a bearing by using a vibration sensor, and perform abnormality diagnosis on the basis of the analysis result of the collected measurement data.

The monitoring control part 60 may receive monitoring control data from the wind turbine power generating apparatus 100 in a cycle of not shorter than 500 ms and not longer than 20 minutes.

As described above, by performing monitoring control using monitoring control data obtained in a cycle longer than the control calculation cycle in addition to state monitoring of the wind turbine power generating apparatus 100 using data obtained in the control calculation cycle of the wind turbine controllers 101, it is possible to determine a temporal change in a longer period related to data which indicates the state or the like of the wind turbine power generating apparatuses 100, and perform state monitoring from a different point of view from a state determination that representative data obtained at a point of time, which makes it possible to monitor the state of the wind turbine power generating apparatuses 100 in more detail.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "contain" and "constitute" are not intended to be exclusive of other components.

The invention claimed is:

1. A data collection system of a wind turbine power generation facility including wind turbine power generating apparatuses, the data collection system comprising:
a plurality of wind turbine controllers provided for the wind turbine power generating apparatuses, respectively, each of the wind turbine controllers including:
a control part for controlling a corresponding one of the wind turbine power generating apparatuses, the control part being configured to, once in every control calculation cycle, perform calculation for control of the corresponding one of the wind turbine power generating apparatuses and send a control signal based on the calculation to the corresponding one of the wind turbine power generating apparatuses;
a representative data memory part for storing representative data related to at least one parameter indicating a state or an operation history of the corresponding one of the wind turbine power generating apparatuses;
a representative data selection part configured to, once in every control calculation cycle of the control part, obtain data related to the at least one parameter and, once in every control calculation cycle of the control part, determine whether to store the obtained data of the at least one parameter as the representative data of the at least one parameter in the representative data memory part;
a calculator serving as a data collection part configured to collect, from each of the wind turbine controllers, the representative data of the at least one parameter related to the state of the wind turbine power generating apparatus stored in the representative data memory part of said each of the wind turbine controllers; and
a local network via which the calculator is connected to the wind turbine controllers, wherein
each of the plurality of wind turbine controllers is configured to:
acquire, from the data related to the at least one parameter during a predetermined period including a time of occurrence of an event related to and impacting one of the plurality wind turbine power generating apparatuses corresponding to one of the plurality of wind turbine controllers, a statistic value as the representative data, and
store the representative data in the representative data memory part.

2. The data collection system of a wind turbine power generation facility according to claim 1,
wherein the representative data selection part is configured to determine, when the event related to the wind turbine power generating apparatuses occurs, that it is necessary to store, in the representative data memory part, data satisfying a predetermined condition from among the data at the time of occurrence of the event or the data in the predetermined period including before and after the time of occurrence of the event, as the representative data.

3. The data collection system of a wind turbine power generation facility according to claim 1,
wherein the event is at least one of a starting, a shutdown, a connection to an electric grid, a disconnection from the electric grid, a detection of a state change, trip, or a pre-set command to start recording during shutdown, of the wind turbine power generating apparatuses.

4. The data collection system of a wind turbine power generation facility according to claim 1,
wherein the event is an excess of a load applied to the wind turbine power generating apparatuses over a predetermined value.

5. The data collection system of a wind turbine power generation facility according to claim 1,
wherein the event is an excess of a change amount of a system voltage of an electric power system to which the wind turbine power generating apparatuses are connected over a predetermined value.

6. The data collection system of a wind turbine power generation facility according to claim 1,
wherein the representative data memory part is configured to store the time of occurrence of the event obtained by an internal clock of the control part, together with the representative data selected by the representative data selection part, every time the event occurs.

7. The data collection system of a wind turbine power generation facility according to claim 1, further comprising:
a state monitoring part configured to monitor the state of each of the wind turbine power generating apparatuses on the basis of the representative data collected by the data collection part,
wherein the representative data memory part is configured to store the representative data selected by the representative data selection part every time the event occurs,
wherein the data collection part is configured to collect a plurality of sets of the representative data stored in the representative data memory part every time the event occurs, and
wherein the state monitoring part is configured to detect an abnormality of each of the wind turbine power generating apparatuses by comparing the plurality of sets of the representative data.

8. The data collection system of a wind turbine power generation facility according to claim 1, further comprising:
a state monitoring part configured to monitor the state of each of the wind turbine power generating apparatuses on the basis of the representative data collected by the data collection part,
wherein the data collection part is configured to collect the representative data stored in the representative data memory part of each of the wind turbine power generating apparatuses, and
wherein the state monitoring part is configured to detect an abnormality of each of the wind turbine power generating apparatuses by comparing the representative data of the wind turbine power generating apparatuses.

9. The data collection system of a wind turbine power generation facility according to claim 1, further comprising:
a state monitoring part configured to monitor the state of the wind turbine power generating apparatus on the basis of the representative data collected by the data collection part,
wherein the local network is connected to the state monitoring part via the Internet, and
wherein the data collection part is configured to transmit the representative data collected from each of the wind turbine controllers to the state monitoring part via the Internet.

10. The data collection system of a wind turbine power generation facility according to claim 1, further comprising:
a monitoring control part for performing operation control or state monitoring for the wind turbine power generating apparatuses,
wherein the monitoring control part is configured to receive monitoring control data from the wind turbine power generating apparatuses once in every cycle which is longer than the control calculation cycle of the control part.

11. A wind turbine power generation facility, comprising:
wind turbine power generating apparatuses; and
the data collection system according to claim 1, configured to collect representative data related to at least one parameter indicating a state or an operation history of the wind turbine power generating apparatuses.

12. A method of collecting data of and controlling a wind turbine power generation facility, the wind turbine power generation facility including the wind turbine power generating apparatuses which include wind turbine controllers, respectively, each of the wind turbine controllers including a control part for controlling a corresponding one of the wind turbine power generating apparatuses, the control part being configured to, once in every control calculation cycle, the method comprising:
a controlling step of, by using the control part, performing calculation for control of the corresponding one of the wind turbine power generating apparatuses and sending a control signal based on the calculation to the corresponding one of the wind turbine power generating apparatuses once in every control calculation cycle;

a representative data selection step of, by using each of the wind turbine controllers, obtaining data related to the at least one parameter indicating a state or an operation history of the corresponding one of the wind turbine power generating apparatuses once in every control calculation cycle of the control part during a predetermined period including a time of occurrence of an event related to and impacting the corresponding one of the wind turbine power generating apparatuses corresponding to one of the wind turbine controllers, and determining whether to store the obtained data of the at least one parameter as the representative data of the at least one parameter for the control calculation cycle of the control part, and acquire, from the obtained data, a statistic value as the representative data;

a representative data storage step of, by using each of the wind turbine controllers, storing the representative data determined as necessary to be stored in the representative data selection step; and a data collection step of collecting, from each of the wind turbine controllers, the representative data of the at least one parameter related to the state of the corresponding one of the wind turbine power generating apparatuses stored in the representative data storage step, by using a calculator connected to the wind turbine controllers via a local network.

13. The data collection system of a wind turbine power generation facility according to claim 1, wherein
the plurality of wind turbine controllers are configured to obtain the representative data for each predetermined period, and
based on a processing result by the representative data selection part, overwrite and update the representative data stored in the representative data memory part during the predetermined period.

14. The data collection system of a wind turbine power generation facility according to claim 1,
wherein the representative data memory part includes a ring buffer including a plurality of buffers logically arranged in a ring shape, and
wherein each of the plurality of buffers is configured to store the representative data related to a single said event.

\* \* \* \* \*